(12) United States Patent
Wang

(10) Patent No.: US 6,674,915 B1
(45) Date of Patent: Jan. 6, 2004

(54) DESCRIPTORS ADJUSTMENT WHEN USING STEERABLE PYRAMID TO EXTRACT FEATURES FOR CONTENT BASED SEARCH

(75) Inventor: Lizhi Wang, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/440,491

(22) Filed: Nov. 15, 1999

Related U.S. Application Data
(60) Provisional application No. 60/158,335, filed on Oct. 7, 1999.

(51) Int. Cl.[7] .............................. G06K 9/40; G06K 9/56; G06K 9/54; G06K 9/34
(52) U.S. Cl. ...................... 382/263; 382/205; 382/240; 382/305; 382/170
(58) Field of Search ................................ 382/190, 205, 382/219, 220, 221, 240, 260, 261, 262, 263, 264, 265, 274, 305, 130, 170, 181; 345/625, 853; 348/96, 97, 107; 707/3, 4, 530

(56) References Cited

U.S. PATENT DOCUMENTS

| | | | |
|---|---|---|---|
| 4,646,250 A | 2/1987 | Childress | 707/507 |
| 4,672,683 A | 6/1987 | Matsueda | 382/305 |

(List continued on next page.)

OTHER PUBLICATIONS

Gregory A. Baxes, Principles and Application of Digital Image Processing ISBN: 0–471–00949–0; John Wiley & Sons, Inc., 1994.*

Freeman et al, Design and Use of Steerable Filters, IEEE Paper ISBN: 0162–8828–9, Sep. 1991, vol. 13, No. 9, pp. 891–906.*

Swain, Michael J., et al.; Color Indexing; International Journal of Computer Vision; vol. 7; No. 1; 1991; Kluwer Academic Publishers; pp. 11–32.

Tamura, Hideyuki et al.; Textural Features Corresponding to Visual Perception; IEEE Transactions on Systems, Man, and Cybernetics; vol. SMC–8; No. 6; Jun. 1978; pp. 460–472.

Oracle8 ™Image Data Cartridges; Features Overview; Jun. 1997; pp. 1–5, 1–8.

VIR Image Engine; Products & Technologies; Virage, Inc.; 1998; pp. 1, 1–3.

(List continued on next page.)

*Primary Examiner*—Mehrdad Dastouri
(74) *Attorney, Agent, or Firm*—Blakely, Sokoloff, Taylor & Zafman LLP

(57) ABSTRACT

A method of adjusting image descriptors when using steerable pyramid to extract features for content-based search is disclosed in this invention. Using steerable pyramid, the original image is filtered to produce Gaussian images and Laplacian images. The image descriptors are formed by filtering the Laplacian images. The filtering of the Laplacian images provides orientation data and energy data. From the orientation data, a first set of global information and local information is generated. From the energy data, a second set of global information and local information is generated. The descriptors are extracted from the respective sets of global information and local information associated with the orientation data and the energy data. The descriptors associated with the orientation data and the descriptors associated with the energy data are combined to form an image descriptor. The Laplacian image may be adjusted prior to the application of the filter. The adjustment is necessary since the value of the Laplacian image may not always be positive. When the adjustment is made to the Laplacian image, a spatial shift occurs to the corresponding energy data.

27 Claims, 9 Drawing Sheets

U.S. PATENT DOCUMENTS

| | | | |
|---|---|---|---|
| 4,716,404 A | 12/1987 | Tabata et al. | 345/625 |
| 4,829,453 A | 5/1989 | Katsuta et al. | 382/305 |
| 4,850,025 A | 7/1989 | Abe | 382/220 |
| 4,944,023 A | 7/1990 | Imao et al. | 382/240 |
| 5,012,334 A | 4/1991 | Etra | 348/107 |
| 5,093,867 A | 3/1992 | Hori et al. | 382/141 |
| 5,148,522 A | 9/1992 | Okazaki | 345/855 |
| 5,179,652 A | 1/1993 | Rozmanith et al. | 345/747 |
| 5,202,828 A | 4/1993 | Vertelney et al. | 707/530 |
| 5,220,648 A | 6/1993 | Sato | 707/3 |
| 5,249,056 A | 9/1993 | Gunday et al. | 348/97 |
| 5,381,158 A | 1/1995 | Takahara et al. | 345/156 |
| 5,421,008 A | 5/1995 | Banning et al. | 707/4 |
| 5,428,727 A | 6/1995 | Kurosu et al. | 707/502 |
| 5,434,966 A | 7/1995 | Nakazawa et al. | 345/617 |
| 5,462,370 A | 10/1995 | Kastingschafer et al. | 384/549 |
| 5,469,209 A | 11/1995 | Gunday et al. | 348/96 |
| 5,469,512 A | 11/1995 | Fujita et al. | |
| 5,526,446 A * | 6/1996 | Adelson et al. | 382/260 |
| 5,539,541 A * | 7/1996 | Ushida | 358/448 |
| 5,579,471 A | 11/1996 | Barber et al. | 345/700 |
| 5,586,197 A | 12/1996 | Tsujimura et al. | 382/162 |
| 5,621,821 A | 4/1997 | Pearman et al. | 382/254 |
| 5,633,511 A * | 5/1997 | Lee et al. | 250/587 |
| 5,687,239 A | 11/1997 | Inanaga et al. | 381/309 |
| 5,704,013 A | 12/1997 | Watari et al. | 706/25 |
| 5,729,471 A | 3/1998 | Jain et al. | 725/131 |
| 5,745,126 A | 4/1998 | Jain et al. | 382/154 |
| 5,751,286 A | 5/1998 | Barber et al. | 345/835 |
| 5,767,893 A | 6/1998 | Chen et al. | 725/119 |
| 5,793,888 A | 8/1998 | Delanoy | 382/219 |
| 5,915,036 A * | 6/1999 | Grunkin et al. | 382/132 |
| 5,956,427 A * | 9/1999 | Greenspan et al. | 382/240 |
| 5,974,159 A * | 10/1999 | Lubin et al. | 382/106 |
| 6,256,409 B1 * | 7/2001 | Wang | 382/170 |
| 6,289,123 B1 * | 9/2001 | Xiaomang et al. | 382/181 |
| 6,532,301 B1 * | 3/2003 | Krumm et al. | 382/170 |

OTHER PUBLICATIONS

Binaghi, Elisabetta et al.; Indexing and Fuzzy Logic–Based Retrieval of Color Images; Proceedings of the IFIP TC2/WG2.6 Second Working Conference on Visual Data Base Systems; Budapest, Hungary, Sep. 30–Oct. 3, 1991; edited by E. Knuth and L.M.

Dissertation by Lizhi Wang, University of California, Irvine "Illumination & Geometry Invariant Recognition" submitted in partial satisfaction of the requirements for the degree of Doctor of Philosophy in Engineering, Dis Commitee: Prof. Glenn E. Healey, Chair, Prof. Phillip Sheu, Prof. Geoff Iverson, 1997, pp. ii–xi, 1–105.

Magnifi Application Server; Overview; Magnifi Products; pp. 1–4.

* cited by examiner

DESCRIPTORS ADJUSTMENT WHEN USING STEERABLE PYRAMID TO EXTRACT FEATURES FOR CONTENT BASED SEARCH

This application claims the benefit of U.S. Provisional Patent applications Ser. No. 60/158,335 filed Oct. 7, 1999, which is hereby incorporated by reference.

FIELD OF THE INVENTION

The present invention is in the field of image descriptors and image processing. More specifically, the present invention relates to a technique for image descriptor adjustment when using steerable pyramids to extract image features for content-based search.

BACKGROUND

As image processing applications become more complex, an image search engine needs to be able to search and retrieve information about images effectively and efficiently. Images are often retrieved from a database by similarity of image features. Image processing allows for the comparison of a reference image against another image or multiple images in order to determine a "match" or correlation between the respective images. Accordingly, a variety of different image-matching techniques have been employed to determine such a match or correlation between images.

One such image matching technique is known as object classification. The object classification technique operates by segmenting the original image into a series of discrete objects. These discrete objects are then measured using a variety of shape measurement identifications, such as shape dimensions and statistics, to identify each discrete object. Accordingly, each of the discrete objects are then classified into different categories by comparing the shape measurement identifications associated with each of the discrete objects against known shape measurement identifications of known reference objects. As such, the shape measurement identifications associated with each of the discrete objects are compared against known shape measurement identifications of known reference objects in order to determine a correlation or match between the images.

Another image matching technique utilized in determining a match between images is a process known as match filtering. Match filtering utilizes a pixel-by-pixel or image mask comparison of an area of interest associated with the proffered image against a corresponding interest area contained in the reference image. Accordingly, provided the area of interest associated with the proffered image matches the corresponding interest area of the reference image, via comparison, an area or pixel match between the images is accomplished and the images are considered to match.

Yet another technique utilizes a series of textual descriptors which are associated with different reference images. The textual descriptors describe the image with textual descriptions, such as shape (e.g., round), color (e.g., green), and item (e.g., ball). Accordingly, when a proffered image is received for comparison, the textual descriptor of the proffered image is compared against the textual descriptors associated with the reference images. As such, the textual descriptor associated with the respective images under comparison are compared to each other in order to determine a best match between the textual descriptions associated with each image, and therefore a match between the respective images.

Each of the aforementioned image matching techniques uses different types of data or partial image data to describe the images. However, these techniques typically may not use the actual full image data associated with the each image. Accordingly, these techniques do not provide for an optimally accurate image comparison since they are limited to the usage of only a small or fractional portion of the full representative image data. Thus, when a search for similar images is conducted against a basis image, these techniques often result in the matching of very different images as having a correlation to one another. This partial-matching result is due in part by the limited amount or type of data used in the image comparison process.

SUMMARY OF THE INVENTION

A method of creating image descriptors by applying steerable filter to Laplacian images of a steerable pyramid is disclosed. The Laplacian images are generated by two corresponding Gaussian images in the steerable pyramid. If the Laplacian images possess negativity, they are adjusted accordingly to eliminate the negativity. Steerable filters are applied to the non-negative Laplacian images to generate orientation data and energy data. The adjustment made to the Laplacian images are correspondingly removed from the orientation data and the energy data.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Figure 1:
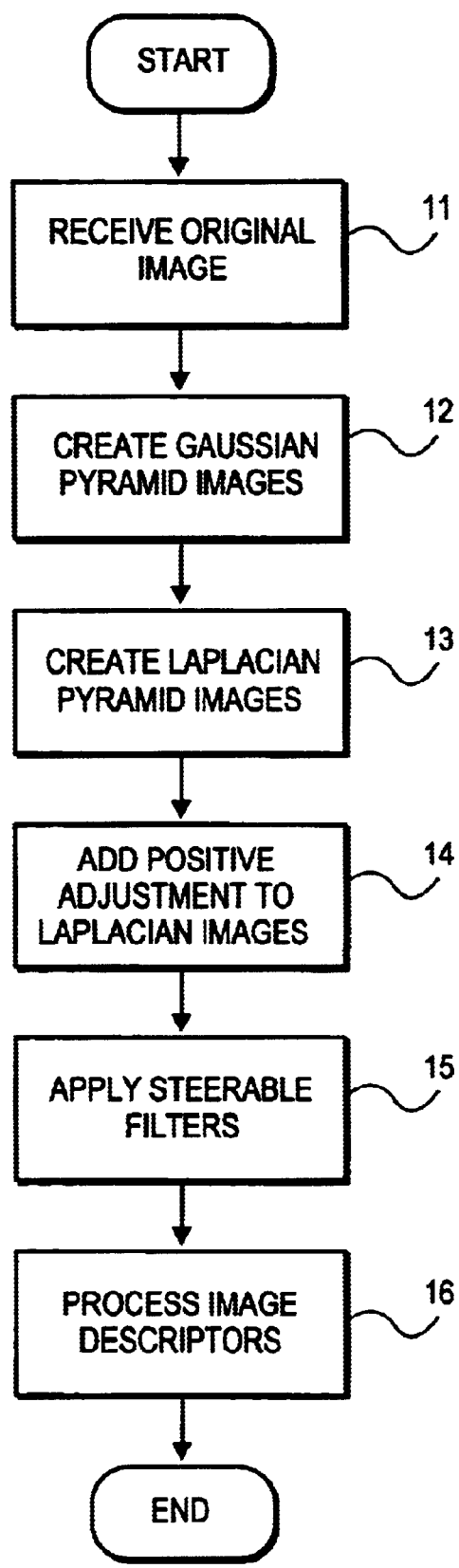
FIG. 1 illustrates an exemplary simplified flow diagram showing generation of image descriptors from an input image.

FIG. 1 illustrates an exemplary simplified flow diagram of one embodiment of the present invention. At step 11, an original image is received. At step 12, using Gaussian filter in the Gaussian pyramid, the original image is filtered to produce lower resolution images of the original image. These filtered images are then used to create images in the Laplacian pyramid in step 13. At step 14, the Laplacian images are adjusted, if necessary, to keep them from being negative in values. This ensures that the input to the steerable filters of step 15 is always positive. The steerable filters generate orientation map and energy map for the corresponding input images. Finally, in step 16, the image descriptors of the original image are created and may subsequently be processed.

A steerable pyramid is a multi-scale, multi-oriented linear image decomposition that provides a useful front-end for many computers image application. In one embodiment of the steerable pyramid, the original image is decomposed into sets of low-pass and band-pass components via Gaussian and Laplacian pyramids, respectively.

Figure 2A:
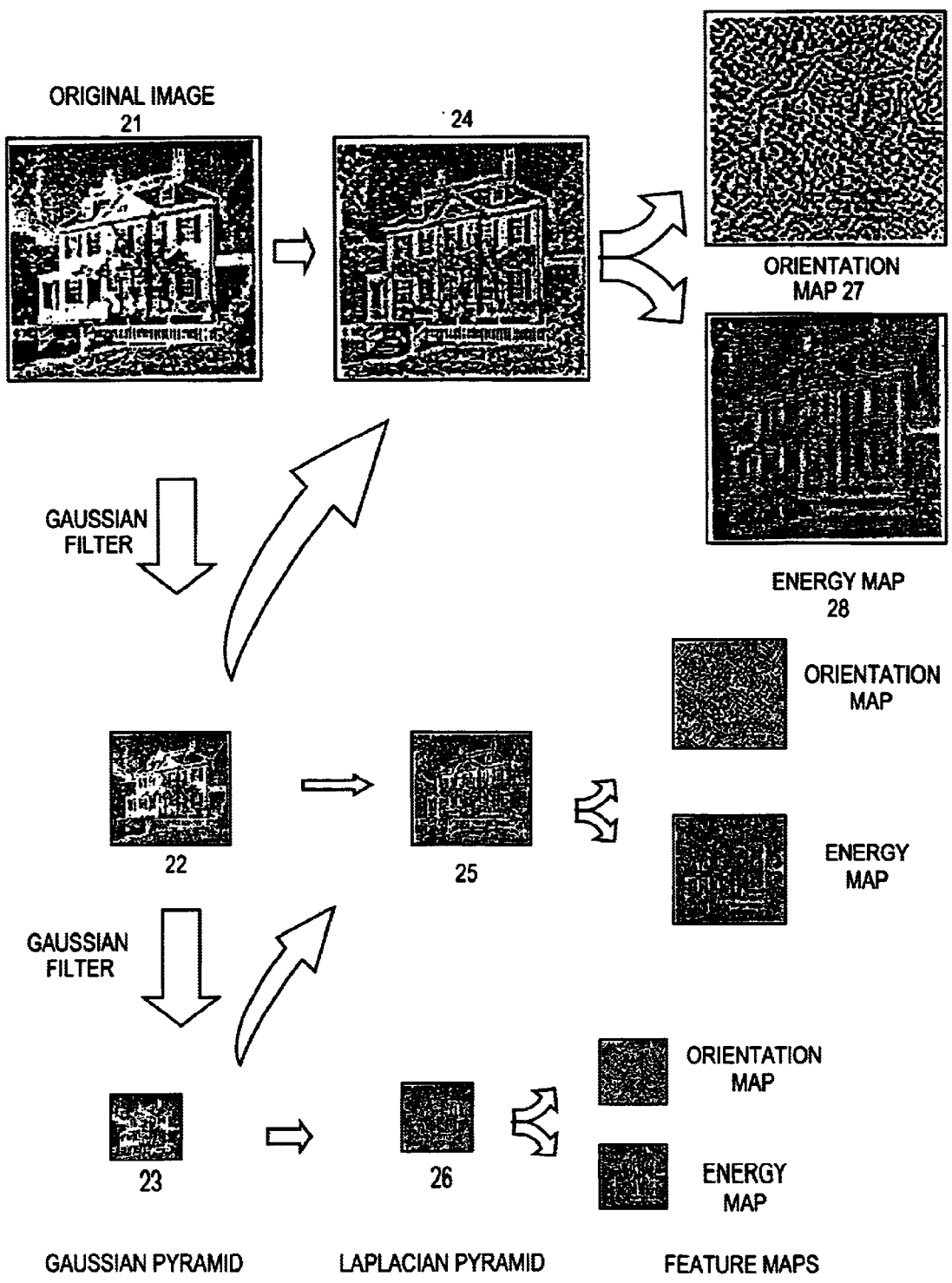
FIG. 2A illustrates one exemplary steerable pyramid.

The Gaussian pyramid consists of low pass filtered (LPF) versions of the input image in decreasing resolution. The LPF versions of the input images are the Gaussian filter responses. FIG. 2A illustrates an exemplary representation of the steerable pyramid as used in one embodiment of the present invention. Each stage of the Gaussian pyramid is computed by low-pass filtering and by sub-sampling of the previous stage. For example, starting with the original image 21, the low-resolution images 22 and 23 in the Gaussian pyramid are generated by applying Gaussian filters to the image in the previous stage.

Once the appropriate Gaussian pyramid images have been generated, the Laplacian pyramid images can be generated. The Laplacian pyramid consists of band-pass filtered (BPF) versions of the input image. Each stage of the Laplacian pyramid are formed by subtracting the neighboring two Gaussian pyramid levels. In FIG. 2A, the Laplacian pyramid includes images 24,25, and 26. In this example, Laplacian image 25 is derived from Gaussian image 22 and Gaussian image 23. The bottom level of the Laplacian pyramid 26 is merely the bottom level of the Gaussian pyramid 23 as there is nothing left to subtract. The pyramid algorithm breaks the image down into a series of frequency bands which, when summed together, reproduce the original image without any distortion.

One aspect of this pyramid algorithm is that the result of the subtraction of the two Gaussian images is not always positive. According to the example shown in FIG. 2A, the output image of a Laplacian filter or, in other words, the subtraction of the two corresponding Gaussian images might possibly be negative. In one embodiment, prior to applying the steerable filters to the Laplacian image, a verification of the subtraction result is conducted. If the result is negative, an adjustment is added to keep it from being negative. The adjustment is later removed without causing any variances to the image. The output of the steerable filter is an orientation and an energy map. FIG. 2A illustrates the output orientation map 27 and the output energy map 28 corresponding to the input Laplacian image 24.

Figure 2B:
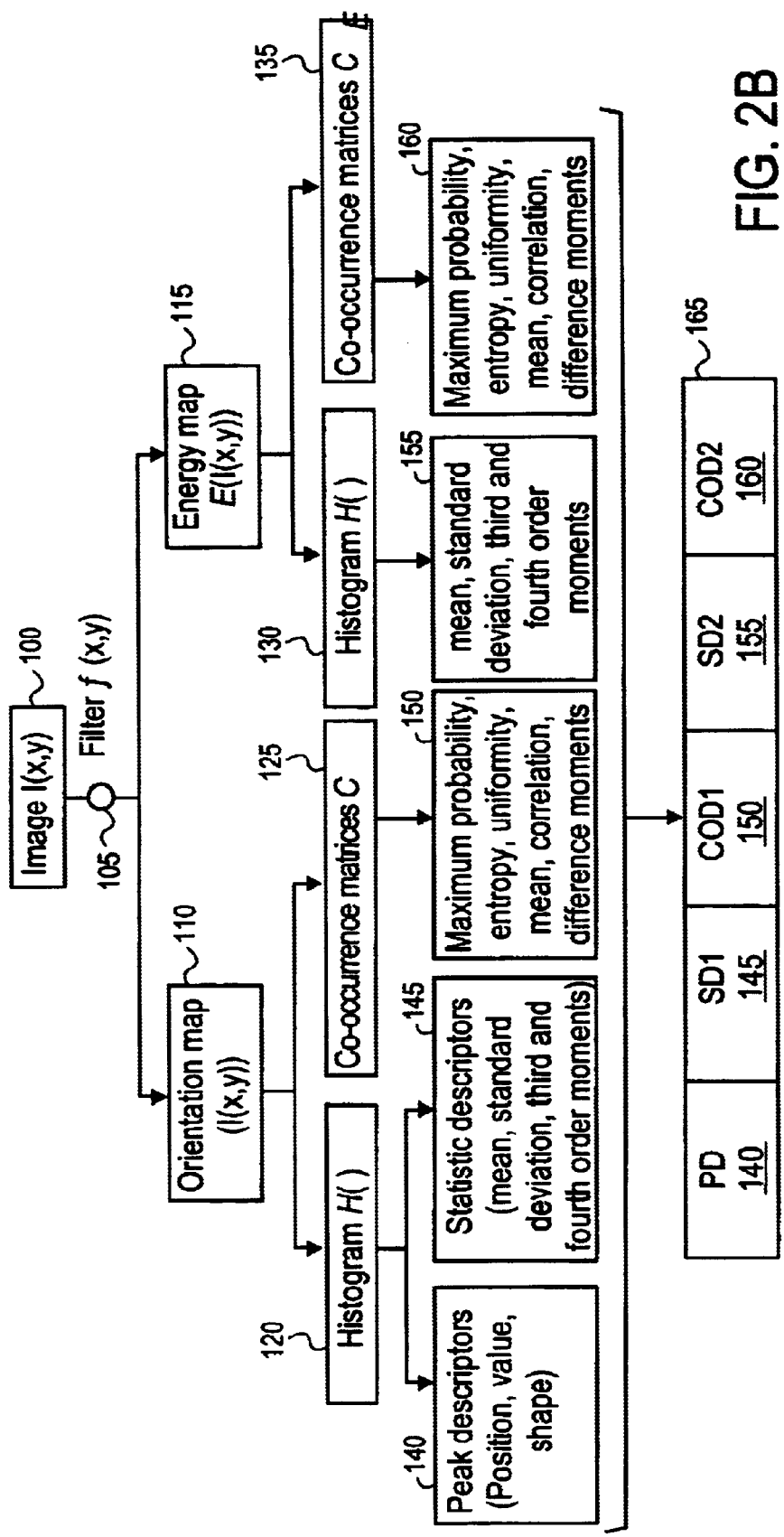
FIG. 2B illustrates an exemplary block diagram showing construction of an image descriptor from an original image.

FIG. 2B illustrates an embodiment of a method for generating a multi-element image descriptor. Particularly, FIG. 2B illustrates, in block flow diagram format, one embodiment of a method of generating an image descriptor which is representative of a multi-band image for use in image processing.

Image features extracted from the output of spatial filters are often used for image representation. The application of multi-band images to spatial filters enables the construction of feature sets which contain a wide range of spectral and spatial properties. One such type of oriented spatial filter is the steerable filter. Steerable filter is a class of filters in which a filter of arbitrary orientation is synthesized as a linear combination of a set of "basis filters". Steerable filters obtain information about the response of a filter at any orientation using the small set of these basis filters.

In one embodiment, $$x^2 \exp\left(-\frac{x^2+y^2}{2*\sigma^2}\right)$$

is chosen as the kernel of the steerable filter. Accordingly, for this kernel of information, a steerable filter at an arbitrary orientation θ can be synthesized using a linear combination of three basis filters according to:

$$h^\theta(x,y) = k_1(\theta)h^0(x,y) + k_2(\theta)h^{60}(x,y) + k_3(\theta)h^{120}(x,y),$$

where $$h^0(x,y) = x^2 \exp\left(-\frac{x^2+y^2}{2*\sigma^2}\right),$$

$$h^{60}(x,y) = \left(\frac{1}{2}x + \frac{\sqrt{3}}{2}y\right)^2 \exp\left(-\frac{x^2+y^2}{2*\sigma^2}\right),$$

$$h^{120}(x,y) = \left(-\frac{1}{2}x + \frac{\sqrt{3}}{2}y\right) \exp\left(-\frac{x^2+y^2}{2*\sigma^2}\right)$$

and $$k_1(\theta) = 1 + 2\cos 2\theta$$

$$k_2(\theta) = 1 - \cos 2\theta + \sqrt{3}\sin 2\theta$$

$$k_3(\theta) = 1 - \cos 2\theta - \sqrt{3}\sin 2\theta.$$

As illustrated in the embodiment of FIG. 2B, an image [I(x,y)] 100 is applied to the steerable filter [Filter f θ (x,y)] 105 which provides two different matrices for each image, an orientation matrix 110 and an energy matrix 115. The orientation matrix 110, also referred to as an Orientation Map Θ (I(x,y)) 110, is derived by computing the dominant orientation at each pixel position (x,y) by using equation (1):

$$\theta(x,y) = \frac{1}{2}\arctan\left(\frac{\sqrt{3}\,(E(60°)(x,y) - E(120°)(x,y))}{2E(0°)(x,y) - E(60°)(x,y) - E(120°)(x,y)}\right). \quad (1)$$

The energy matrix 115, also referred to as an Energy Map E (I(x,y)) 115, corresponds to the dominant orientation at each pixel position (x,y) in accordance with equation (2):

$$E(x,y) = E(0°) + E(60°) + E(120°) + 2\sqrt{E^2(0°) + E^2(60°) + E^2(120) - E(0°)(E(60°) + E(120°)) - E(60°)E(120°)} \quad (2)$$

Accordingly, for each matrix or map, the Orientation Map Θ (I(x,y)) 110 and the Energy Map E (I(x,y)) 115, a corresponding histogram or set of histograms is used to represent global information, along with a set of co-occurence matrices which are used to represent local information. As such, the Orientation Map Θ (I(x,y)) 110 is represented as a corresponding orientation histogram H (θ) 120 and set of orientation co-occurence matrices CΘ 125. Similarly, the Energy Map E (I(x,y)) 115 is represented as a corresponding energy histogram H(E) 130 and set of energy co-occurence matrices C$_E$ 135. Therefore, each image 100 is represented by a corresponding orientation histogram H (θ) 120, a set of orientation co-occurence matrices CΘ 125, a corresponding energy histogram H(E) 130, and a set of energy co-occurence matrices C$_E$ 135.

Next, a series of descriptors are extracted from each of the corresponding histograms and co-occurence matrices. In one embodiment, the descriptors extracted from the orientation histogram H(θ) 120 of the Orientation Map Θ (I(x,y)) 110 are peak descriptors (PD) 140 and statistic descriptors (SD1) 145. The peak descriptors (PD) 140 comprise position, value, and shape data associated with the orientation histogram H(θ) 120. The statistic descriptors (SD1) 145 indicate mean, standard deviation, third and fourth order moments associated with the orientation histogram H( 0) 120. Select elements within the peak descriptors (PD) 140 are used to classify images into different categories, whereas the statistic descriptors (SD1) 145 are used to describe the shape of the orientation histogram H(θ) 120.

Descriptors extracted from the orientation co-occurence matrices CΘ 125 of the Orientation Map Θ (I(x,y)) 110 are co-occurence descriptors (COD1) 150. The co-occurence descriptors (COD1) 150 comprise maximum probability, entropy, uniformity, mean, correlation, and difference moments. The co-occurence descriptors (COD1) 150 in the present embodiment are computed in four different orientations (−45 Degrees, 0 Degrees, 45 Degrees, and 90 Degrees).

Correspondingly, the descriptors extracted from the energy histogram H(E) 130 of the Energy Map E (I(x,y)) 115 are statistic descriptors (SD2) 155. The statistic descriptors (SD2) 155 indicate mean, standard deviation, third and fourth order moments associated with the energy histogram H(E) 130. The statistic descriptors (SD2) 155 associated with the energy histogram H(E) 130 are used to describe the shape of the orientation energy histogram H(E) 130.

Likewise, the descriptors extracted from the energy co-occurence matrices C$_E$ 135 of the Energy Map E (I(x,y)) 115 are co-occurence descriptors (COD2) 160. The co-occurence descriptors (COD2) 160 comprise maximum probability, entropy, uniformity, mean, correlation, and difference moments. The co-occurence descriptors (COD2) 160 in the present embodiment are computed in four different orientations (−45 Degrees, 0 Degrees, 45 Degrees, and 90 Degrees).

The descriptors associated with an image are combined in order to form a feature vector or image descriptor 165. As such, in one embodiment, each individual descriptor 170 associated with an image comprises a peak descriptors (PD) 140, statistic descriptors (SD1) 145, co-occurence descriptors (COD1) 150, statistic descriptors (SD2) 155, and co-occurence descriptors (COD2) 160, which are combined to form an image descriptor 165. As such, the image descriptor 165 is a full representation of each image which may be used for image processing. For multi-band applications, an image descriptor 165 is generated for each information band comprising the multi-band image, as such, each information band associated with each multi-band image has a corresponding image descriptor 165. For instance, a multi-band image using the RGB color spectrum would have an individual image descriptor 165 for each information or color band (RGB) of the multi-band image.

One aspect of the present invention, which will be appreciated from the above discussion with reference to FIG. 2B, is that the input image [I(x,y)] 100 may carry a negative value when applied to the steerable filter [Filter f θ (x,y)] 105 and thus needs to be adjusted. For example, under certain circumstances, the subtraction of the two levels of the Gaussian images may produce a Laplacian image or the [I(x,y)] 100 image having a negative value. The Laplacian image having a negative intensity value can not be used as input to the steerable filter since the output orientation data and energy data will not be meaningful. Consequently, the respective orientation map 110 and energy map 115 can not be used to create image descriptors.

In one embodiment of the present invention, the negativity of the input image [I(x,y)] 100 is determined by measuring its intensity value. For example, as shown in FIG. 2A, Gaussian image 23 may possess higher intensity value than Gaussian image 22. As previously described, Laplacian image 25 is generated by the subtraction of the two Gaussian images at the corresponding levels, thus in this example, causing Laplacian image 25 to possess a negative intensity value. Referring back to FIG. 2B, based on this intensity value, an adjustment is made by adding a constant value C to the input image [I(x,y)] 100, or the Laplacian image, such that the adjusted Laplacian input image I'(x,y) is positive and is in the form:

$$I'(x,y)=I(x,y)+C$$

Accordingly, with the adjusted input image I'(x,y), the output of the steerable basis filter can be expressed by the equation:

$$E'(\Theta)=E(\Theta)+C$$

where E(Θ) is the output of the steerable filter when the steerable filter is applied to the image I(x,y), and where the C is the resulting adjustment to the output of the steerable filter when the adjustment value C is added to the input image I(x,y).

Using the same adjusted Laplacian image I'(x,y) as the input image of the steerable filter, the Orientation map Θ'(I'(x,y)) can be represented by the following equation:

$$\theta'(x, y) = \frac{1}{2}\arctan\left(\frac{\sqrt{3}\,(E(60°)(x, y) + C - E(120°)(x, y) - C)}{2E(0°)(x, y) + 2C - E(60°)(x, y) - C - E(120°)(x, y) - C}\right)$$

The value C in Θ'(x,y) cancels one another, leaving Θ'(I'(x, y)) =θ(I(x,y)). Thus the Orientation map is invariant to the DC component change.

Similarly, using the same adjusted Laplacian image I'(x,y) as the input image of the steerable filter, the energy map E'(I'(x,y)) can be represented by the following equation:

$$E'(x, y) = E(0°)(x, y) + E(60°)(x, y) + E(120°)(x, y) + 2$$
$$\sqrt{E^2(0°) + E^2(60°) + E^2(120°) - E(0°)(E(60°) + E(120°)) - E(60°)E(120°)}$$
$$+ 3C$$

Thus, the orientation histogram H (θ) 120 and the orientation co-occurence matrices CΘ 125 do not change. The energy histogram H(E) 130, and the energy co-occurence matrices C$_E$ 135 reserve their shapes but have a spartial shift by a value of 3C. The centered moments are used as descriptors to get rid of the translation caused by the DC component C. Although the intensity value is discussed in this embodiment to detect negativity, other image characteristics may be used.

Figure 3A:
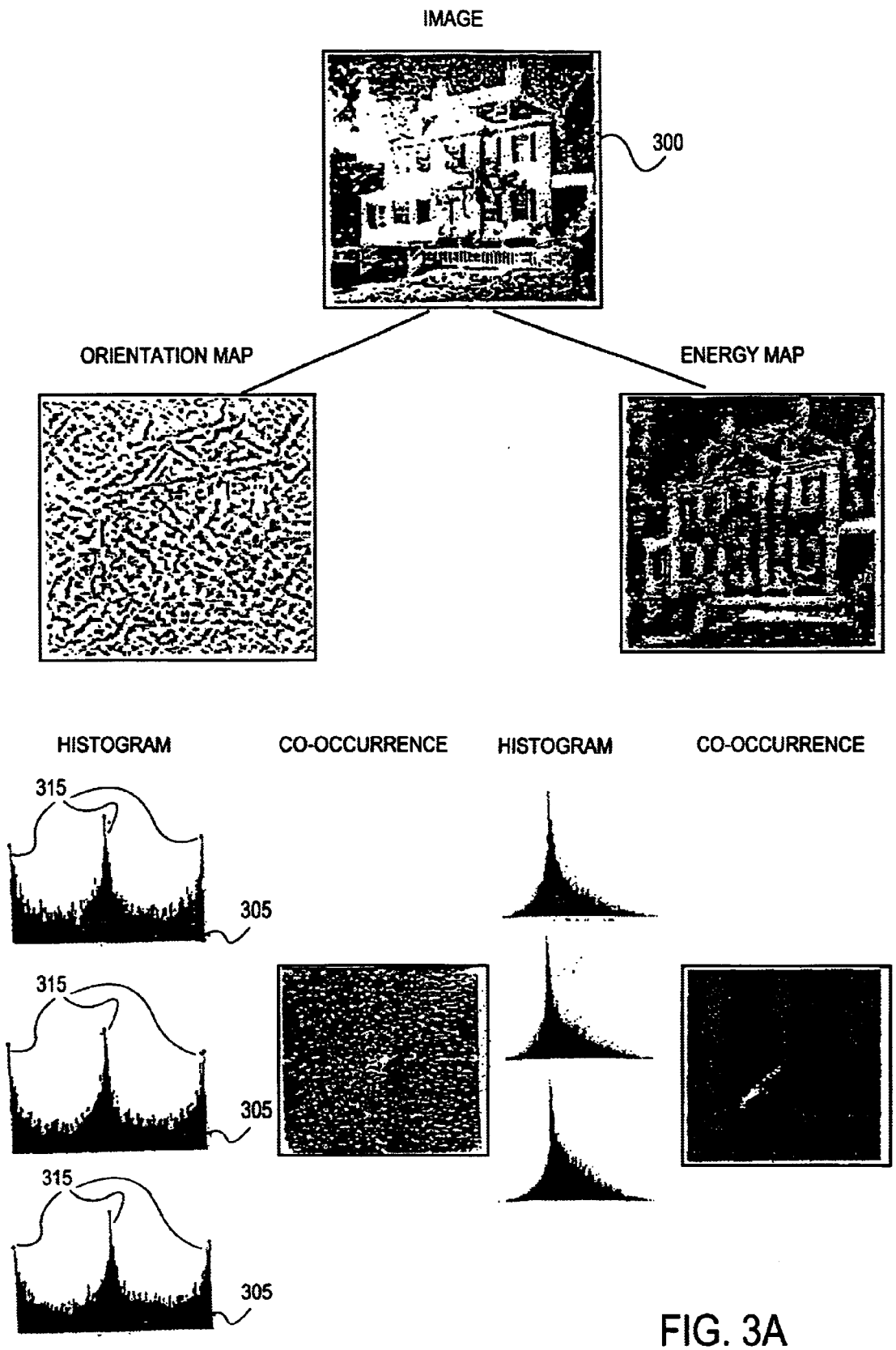
FIG. 3A illustrates an exemplary multi-band image along with its corresponding orientation map, energy map, histogram, and co-occurrence matrix.
Figure 3B:
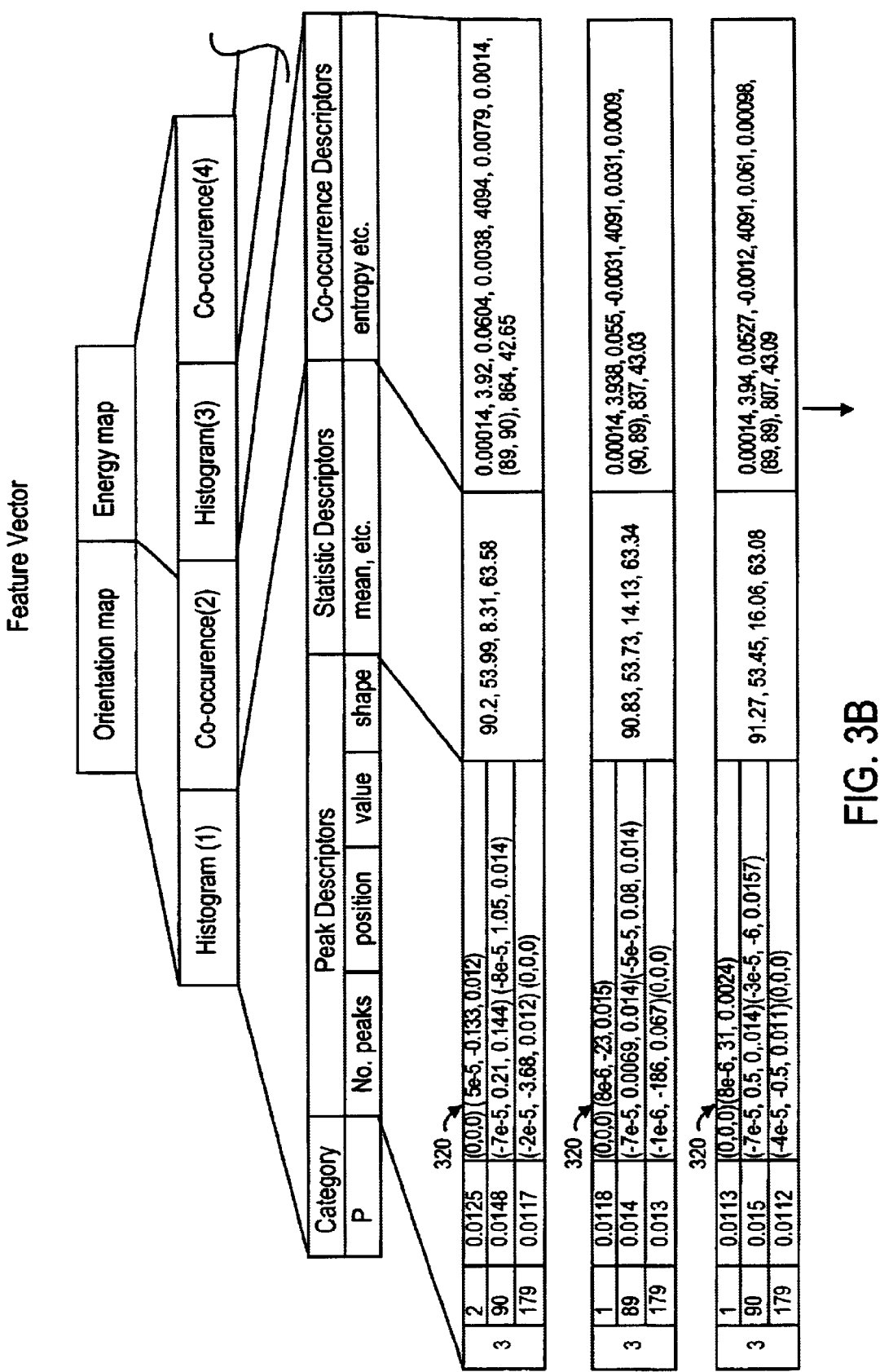
FIG. 3B illustrates an exemplary block diagram of the image descriptor corresponding to the multi-band image of FIG. 3A.
Figure 3B:
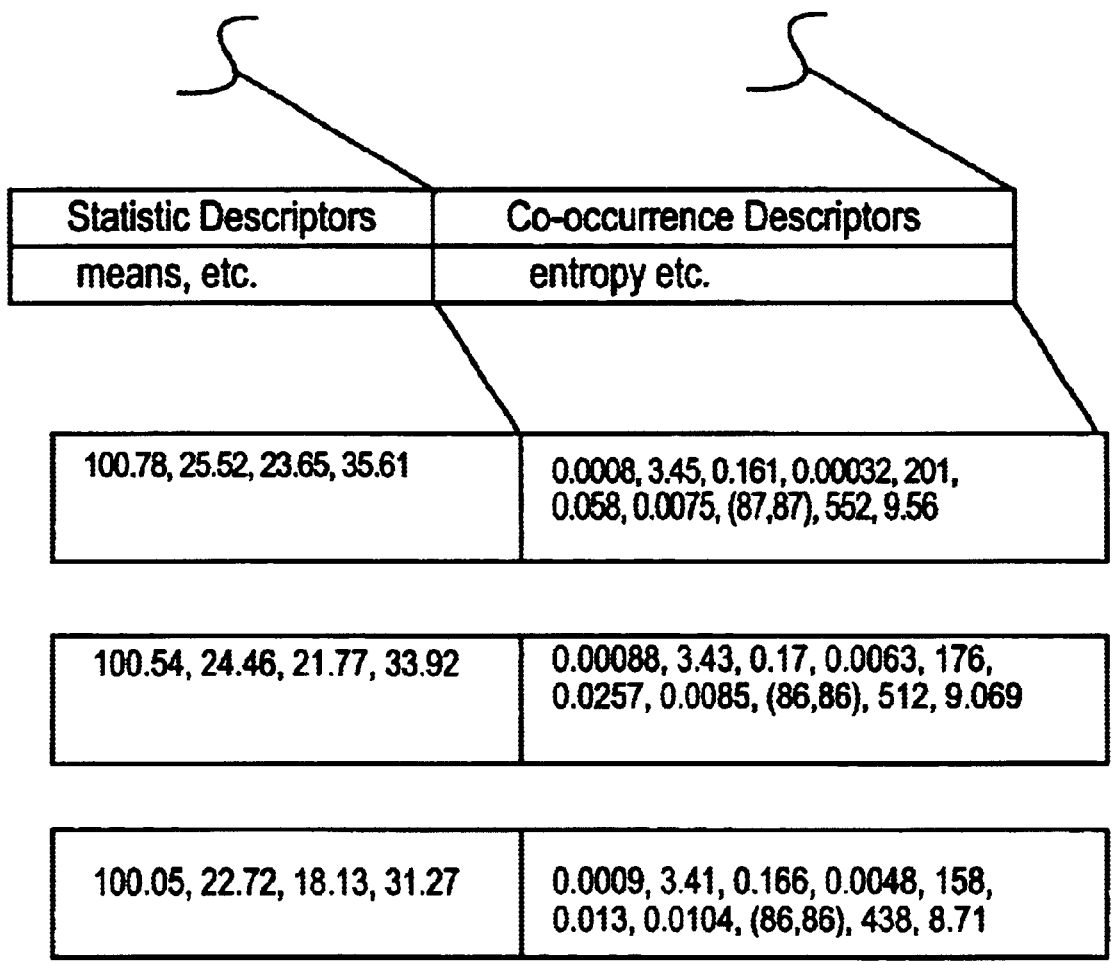
Figure 3B:
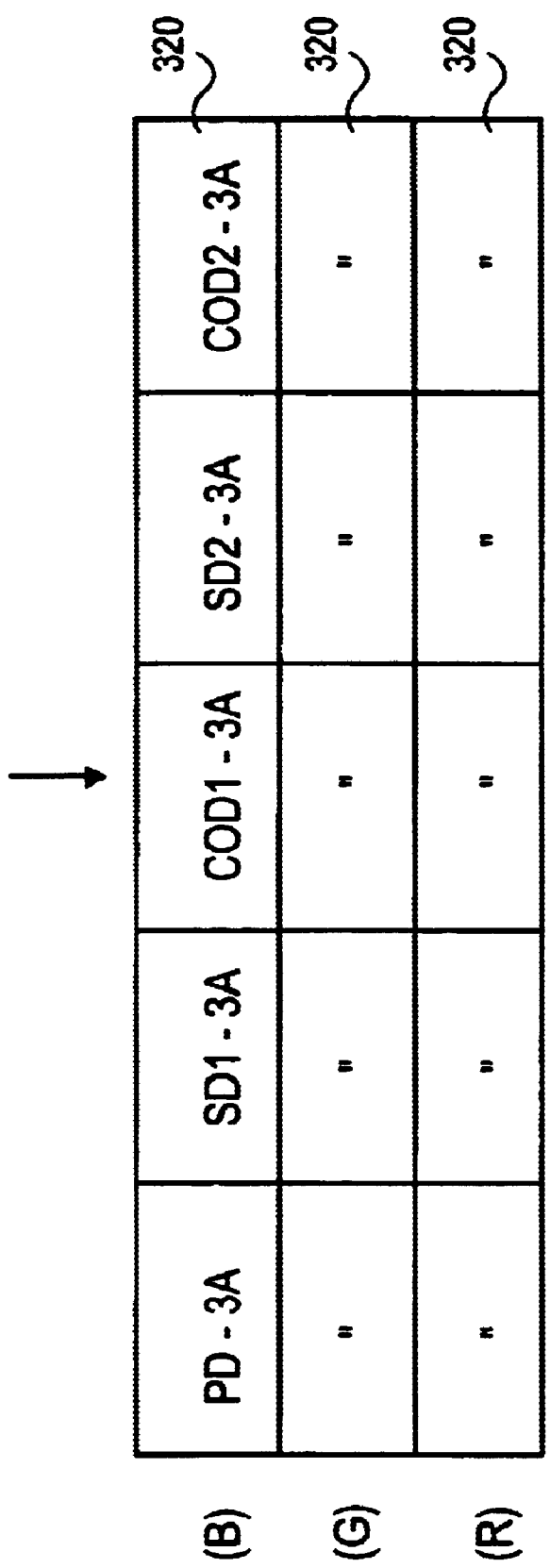

FIG. 3A and FIG. 3B illustrate a multi-band image along with the corresponding respective orientation map and energy map associated with the multi-band image. FIG. 3A and FIG. 3B also illustrate the corresponding histograms (0 Degrees to 181 Degrees) and matrices, in addition to the corresponding image descriptors, associated with the multi-band image. The multi-band image has an associated image descriptor which describes the corresponding multi-band image, each image descriptor constituting a peak descriptor (PD), a statistic descriptor (SD1), a co-occurence descriptor (COD1), a statistic descriptor (SD2), and a co-occurence descriptor (COD2). Each image descriptor describes a particular image in accordance with the attributes associated with that particular individual image.

In FIGS. 3A and FIG. 3B, a representative orientation histogram H(θ) 305 and other related information (histograms/matrices) are illustrated for each information band 310 (e.g., RGB color bands) of the multi-band images 300. Likewise, the corresponding image descriptor 320 provided for each information band 310 of the multi band image 300 contain data corresponding to each representative orientation histogram H(θ) 305 and other related information associated with each information band 310. The representative orientation histograms H(θ) 305 corresponding to the multi-band images 300 of FIGS. 3A exhibits large peaks 315 along the different coordinates of the corresponding orientation histograms H(θ) 305. Correspondingly, the large peaks 315 represented in each representative orientation histogram H(θ) 305 are likewise represented in the corresponding image descriptors 320 associated with each corresponding information band 310 as large peak representative data. Accordingly, those image descriptors 320 which contain large peak representative data, corresponding to the large peaks 315 represented in each representative orientation histogram H(θ) 305, are classified into the large peak category. For instance, the orientation histogram H(θ) 305 associated with the (B) information band (e.g., blue color band) of FIG. 3A and FIG. 3B exhibits a series of large peaks 315 along different coordinates (2 Degrees, 90 Degrees, and 179 Degrees) of the corresponding orientation histogram H(θ) 305, the series of large peaks 315 are likewise reflected in the corresponding image descriptor 320 at 2 Degrees, 90 Degrees, and 179 Degrees. Likewise, the orientation histogram H(θ) 305 associated with the (G) information band (e.g., green color band) of FIG. 3A and FIG. 3B exhibits a series of large peaks 315 along different coordinates (1 Degree, 89 Degrees, and 179 Degrees) of the corresponding orientation histogram H(θ) 305, the series of large peaks 315 are likewise reflected in the corresponding image descriptor 320 at 1 Degree, 89 Degrees, and 179 Degrees. Further, the orientation histogram H(θ) 305 associated with the (R) information band (e.g., red color band) of FIG. 3A and FIG. 3B exhibits a series of large peaks 315 along different coordinates (1 Degree, 90 Degrees, and 179 Degrees) of the corresponding orientation histogram H(θ) 305, the series of large peaks 315 are likewise reflected in the corresponding image descriptor 320 at 1 Degree, 90 Degrees, and 179 Degrees. Although the large peak is being used as a category in this example, it is understood that a variety of different category types could be derived or instituted depending upon a specific or desired implementation of any categorization or image comparison scheme.

Figure 4:
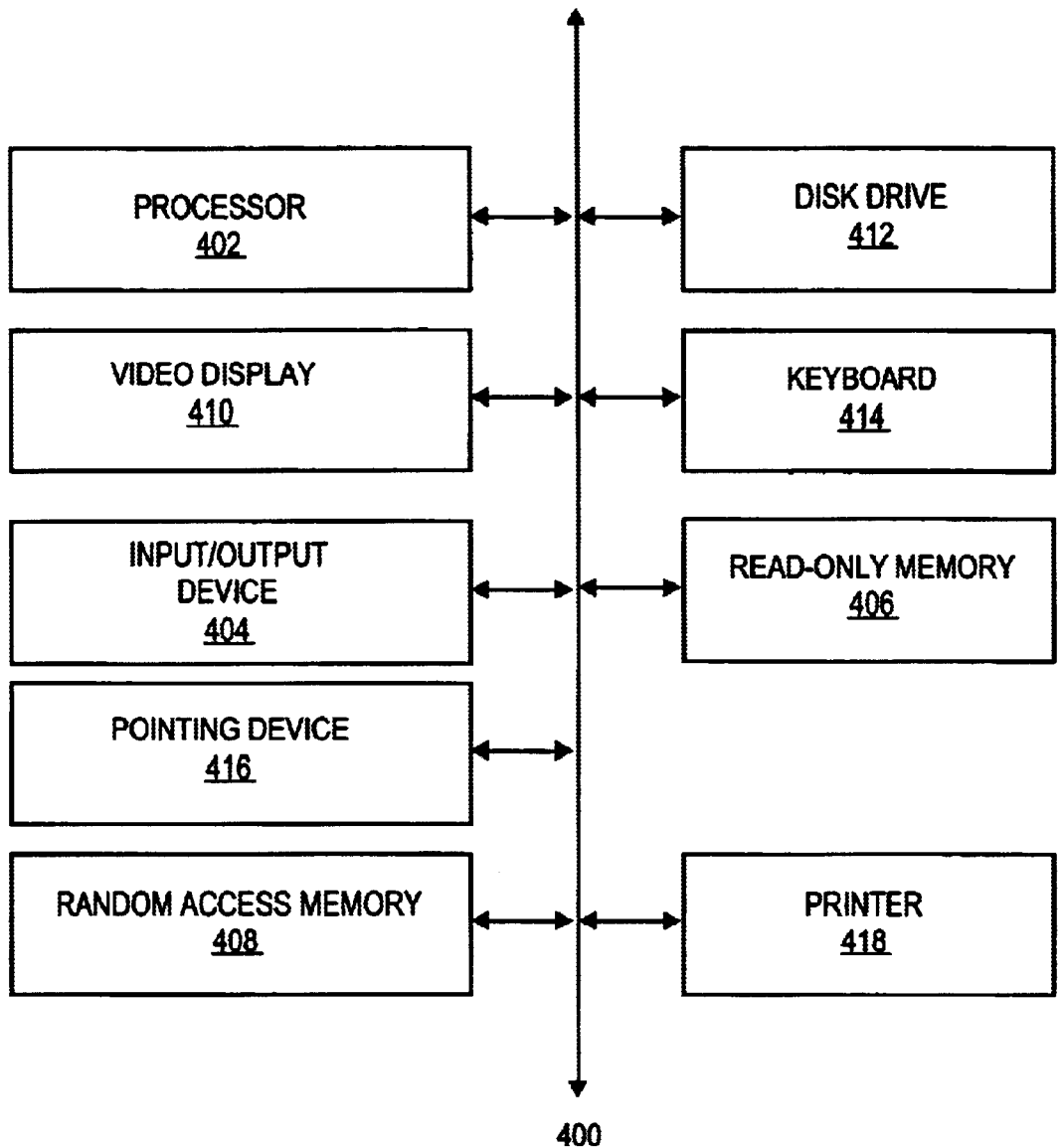
FIG. 4 illustrates an exemplary computer system that can be used in accordance with the present invention.

FIG. 4 illustrates an embodiment of an exemplary computer system that can be used with the present invention. The various components shown in FIG. 4 are provided by way of example. Certain components of the computer in FIG. 4 can be deleted from the addressing system for a particular implementation of the invention. The computer shown in FIG. 4 may be any type of computer including a general purpose computer.

FIG. 4 illustrates a system bus 400 to which various components are coupled. A processor 402 performs the processing tasks required by the computer. Processor 402 may be any type of processing device capable of implementing the steps necessary to perform the addressing and delivery operations discussed above. An input/output (I/O) device 404 is coupled to bus 400 and provides a mechanism for communicating with other devices coupled to the computer. A read-only memory (ROM) 406 and a random access memory (RAM) 408 are coupled to bus 400 and provide a storage mechanism for various data and information used by the computer. Although ROM 406 and RAM 408 are shown coupled to bus 400, in alternate embodiments, ROM 406 and RAM 408 are coupled directly to processor 402 or coupled to a dedicated memory bus (not shown).

A video display 410 is coupled to bus 400 and displays various information and data to the user of the computer. A disk drive 412 is coupled to bus 400 and provides for the long-term mass storage of information. Disk drive 412 may be used to store various profile data sets and other data generated by and used by the addressing and delivery system. A keyboard 414 and pointing device 416 are also coupled to bus 400 and provide mechanisms for entering information and commands to the computer. A printer 418 is coupled to bus 400 and is capable of creating a hard copy of information generated by or used by the computer.

Figure 5:
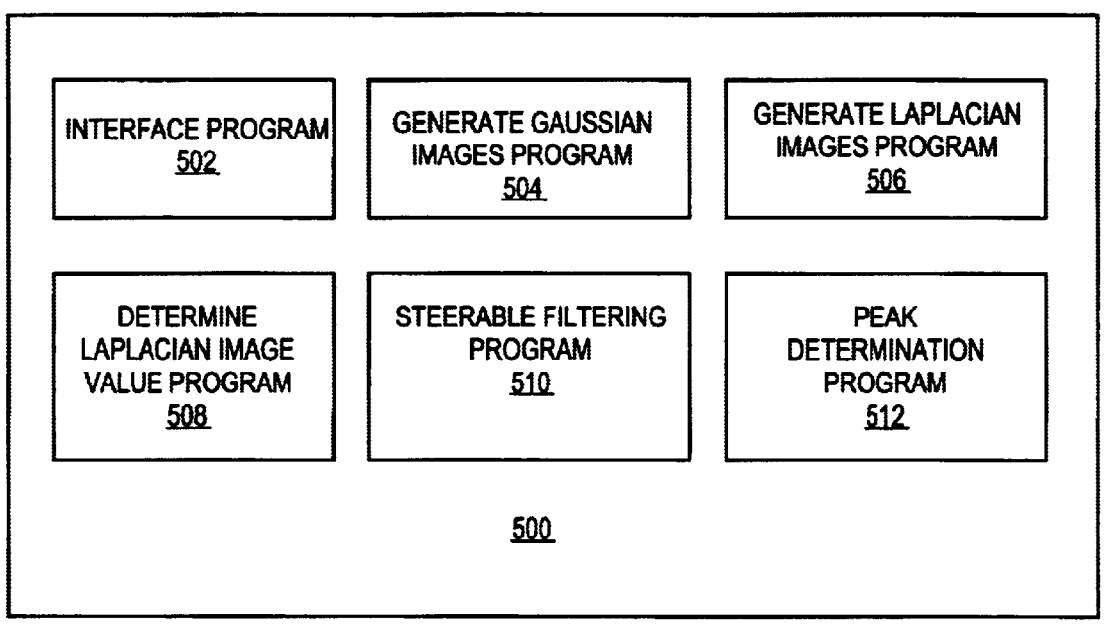
FIG. 5 illustrates an exemplary computer-readable medium that can be used in accordance with the present invention.

FIG. 5 illustrates an embodiment of an exemplary computer-readable medium 500 containing various sets of instructions, code sequences, configuration information, and other data used by a computer or other processing device. The embodiment illustrated in FIG. 5 is suitable, for example, to use with the peak determination method described above. The various information stored on medium 500 is used to perform various data processing operations. Computer-readable medium 500 is also referred to as a processor-readable medium. Computer-readable medium 500 can be any type of magnetic, optical, or electrical storage medium including a diskette, magnetic tape, CD-ROM, memory device, or other storage medium.

Computer-readable medium 500 includes interface code 502 that controls the flow of information between various devices or components in the computer system. Interface code 502 may control the transfer of information within a device (e.g., between the processor and a memory device), or between an input/output port and a storage device. Additionally, interface code 502 may control the transfer of information from one device to another. Computer-readable medium 500 may also include other programs working with one another to produce a result in accordance with the present invention. For example, computer-readable medium 500 may include a program that accept an original image as input and apply appropriate Gaussian filters to generate Gaussian images, as shown in block 504. A Laplacian image generation program 506 may be responsible for generating Laplacian images by using the Gaussian images of program 504 as its input. Prior to executing steerable filter program 510, the intensity value of the Laplacian image is tested for negativity by program 508. Furthermore, in the process of finding image descriptors, program 512 may be executed for peak determination.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method comprising:
   getting a Laplacian image from corresponding Gaussian images in a steerable pyramid;
   verifying the Laplacian image for negative value;
   adjusting the Laplacian image to eliminate the negative value;
   applying a steerable filter to the adjusted Laplacian image to generate orientation data and energy data;
   removing resulting adjustment;
   extracting a plurality of descriptors from the orientation data and the energy data; and
   combining the plurality of descriptors into an image descriptor to be used for image processing.

2. The method of claim 1 wherein getting the Laplacian image comprises subtracting the two neighboring Gaussian images.

3. The method of claim 1 wherein verifying comprises measuring intensity value of the Laplacian image.

4. The method of claim 1 wherein adjusting comprises adding a constant factor to the Laplacian image such that when the steerable filter is applied to the adjusted Laplacian image, the resulting orientation map and energy map are not negative.

5. The method of claim 1 wherein removing resulting adjustment comprises compensating for a spatial shift to the energy data, the spatial shift resulting from the adjustment added to the Laplacian image.

6. A method of filtering images, comprising:
   constructing a plurality of orientation maps and a plurality of energy maps from input images, the input images adjusted by a factor prior to applying filters, the adjustment factor being such that the plurality of orientation maps and the plurality of energy maps are non-negative;
   removing resulting adjustment factors from the plurality of energy maps;
   extracting, for each input image, a plurality of descriptors from corresponding non-negative orientation and energy maps; and
   combining the plurality of descriptors into an image descriptor to be used for image processing.

7. The method of claim 6 wherein the input images are Laplacian images, the Laplacian images constructed by subtracting two corresponding Gaussian images in a steerable pyramid.

8. The method of claim 6 wherein the filters are steerable filters.

9. The method of claim 6 wherein the adjustment is made to the intensity value of the Laplacian images.

10. A method comprising:
    filtering an input image at a first time to produce a corresponding orientation map and a corresponding energy map, each of the orientation map and the energy map being represented by a corresponding histogram and a corresponding set of co-occurrence matrices;
    adjusting the input image by an adjustment factor if the orientation map and/or the energy map is negative, the adjustment factor being such that when the adjusted input image is filtered, the orientation map and/or the energy map is non-negative;
    filtering the adjusted input image at a second time to produce non-negative orientation and energy maps;
    extracting a plurality of descriptors from the non-negative orientation and energy maps; and
    combining the plurality of descriptors into an image descriptor to be used for image processing.

11. The method of claim 10, wherein the filtering is done by applying steerable filters and wherein the input image is a Laplacian image in a steerable pyramid.

12. The method of claim 10, wherein adjusting the input image by an adjustment factor comprises determining the value of the Laplacian image, and adding the adjustment factor such that the value of the Laplacian image is non-negative.

13. The method of claim 10 wherein the intensity value is the value of the Laplacian image.

14. A computer readable medium containing executable instructions which, when executed in a processing system, causes the system to perform a method comprising:
    getting a Laplacian image from corresponding Gaussian images in a steerable pyramid;
    verifying the Laplacian image for negative value;
    adjusting the Laplacian image to eliminate the negative value;
    applying a steerable filter to the adjusted Laplacian image to generate orientation data and energy data;
    removing resulting adjustments;
    extracting a plurality of descriptors from the orientation data and the energy data; and
    combining the plurality of descriptors into an image descriptor to be used for image processing.

15. The computer readable medium of claim 14, wherein getting the Laplacian image comprises subtracting the two neighboring Gaussian images.

16. The computer readable medium of claim 14, wherein verifying comprises measuring intensity value of the Laplacian image.

17. The computer readable medium of claim 14, wherein adjusting comprises adding a constant factor to the Laplacian image such that when the steerable filter is applied to the adjusted Laplacian image, the resulting orientation map and energy map are not negative.

18. The computer readable medium of claim 14, wherein removing resulting adjustment comprises compensating the resulting adjustment factor from the energy map, the resulting adjustment factor corresponding to the adjustment added to the Laplacian image.

19. An apparatus, comprising:
    means for filtering input images to produce corresponding orientation maps and energy maps, each of the orientation maps and the energy maps being represented by a corresponding histogram and a corresponding set of co-occurrence matrices;
    means for adjusting the input images such that the corresponding orientation maps and/or energy maps are non-negative;
    means for extracting, for each input image, a plurality of descriptors from corresponding non-negative orientation and energy maps; and
    combining the plurality of descriptors into an image descriptor to be used for image processing.

20. The apparatus of claim 19, wherein means for filtering input images comprises means for generating Gaussian images from an original image and means for generating Laplacian images from the Gaussian images, and wherein steerable filters are used in filtering the Laplacian images.

21. The apparatus of claim 19, wherein means for adjusting the input images comprises means for calculating intensity value of the Laplacian images and means for adding an adjustment factor to the Laplacian images such that the intensity value is non-negative.

22. A method comprising:
   filtering input images to produce corresponding orientation maps and energy maps, each of the orientation maps and the energy maps being represented by a corresponding histogram and a corresponding set of co-occurrence matrices;
   adjusting the input images such that the corresponding orientation maps and/or energy maps are non-negative;
   extracting a plurality of descriptors from corresponding non-negative orientation and energy maps; and
   combining the plurality of descriptors into an image descriptor to be used for image processing.

23. The method of claim 22, wherein filtering input images comprises:
   generating Gaussian images from an original image;
   generating Laplacian images from the Gaussian images; and
   filtering the Laplacian images by using steerable filters.

24. The method of claim 22, wherein adjusting the input images comprises:
   calculating intensity value of the Laplacian images; and
   adding an adjustment factor to the Laplacian images such that the intensity value is non-negative.

25. A computer system comprising:
   a processor; and
   an image processing logic coupled to the processor, comprising
      generation logic to form Gaussian images from an original image and to form a Laplacian image from the corresponding two Gaussian images,
      adjustment logic to add a value to the Laplacian image such that the Laplacian image is non-negative,
      logic to apply a steerable filter to the adjusted Laplacian image to produce an energy map and an orientation map, each of the orientation map and the energy map being represented by a corresponding histogram and a corresponding set of co-occurrence matrices; and
      image descriptor logic to extract a plurality of descriptors from the orientation map and the energy map, and to combine the plurality of descriptors into an image descriptor to be used for image processing.

26. The computer system of claim 25 further comprising logic to compensate for partial shift to the energy map, the partial shift resulting from the corresponding adjustment made to the Laplacian image.

27. The computer system of claim 25 wherein the Gaussian images and the Laplacian images are in a steerable pyramid, and wherein the value of the Laplacian image is measured by its intensity.

* * * * *